United States Patent Office 3,284,529
Patented Nov. 8, 1966

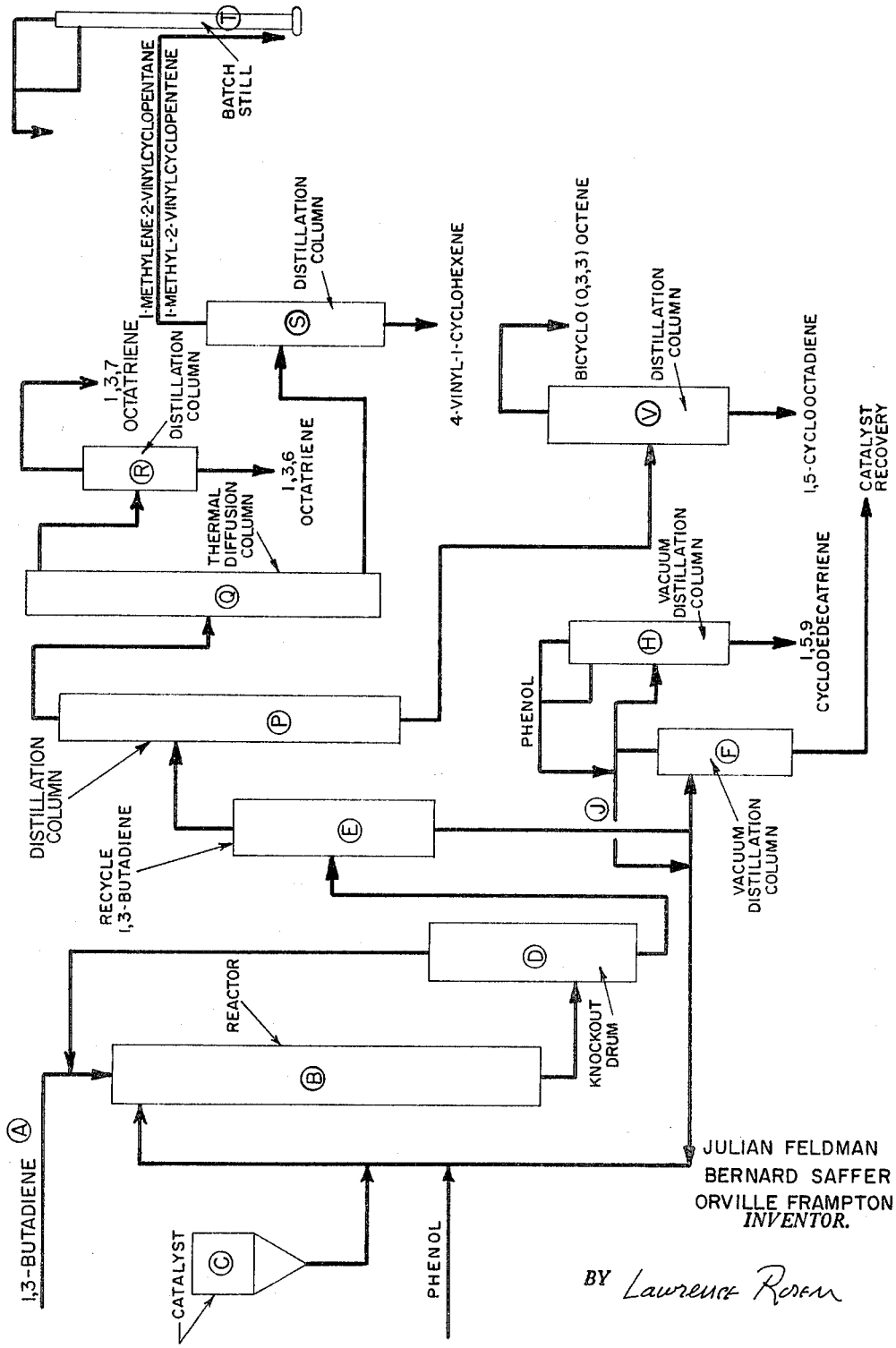

3,284,529
LINEAR OCTATRIENES
Julian Feldman, Bernard A. Saffer, and Orville D. Frampton, Cincinnati, Ohio, assignors to National Distillers and Chemical Corporation, New York, N.Y., a corporation of Virginia
Filed Dec. 31, 1962, Ser. No. 248,518
18 Claims. (Cl. 260—677)

This invention relates to methods of preparing linear dimers from open chain conjugated diolefinic compounds. More particularly, this invention relates to the preparation of substantially pure 1,3,7-octatriene and 1,3,6-octatriene in commercial yields from 1,3-butadiene. This invention also relates to the recovery of 1,3,6-octatriene and 1,3,7-octatriene from mixtures containing 4-vinyl-1-cyclohexene.

The prior art shows the production of cycloolefins from conjugated open chain diolefinic compounds using certain zerovalent nickel compounds as catalysts. The catalysts usable are derivatives of nickel carbonyl bearing in lieu of at least one of its carbonyl groups a compound of trivalent nitrogen, phosphorus, or antimony as described by Reed in United States Patents 2,686,208 and 2,686,209, or later modifications thereof.

It has sometimes been found desirable, but not essential, to use a phenol as a polymerization inhibitor to prevent the open-chain diolefin from polymerizing into unwanted polymers. The amount of phenol added as a polymerization inhibitor is from 0.01 to 3% by weight of the diolefin starting material. It is reported that the use of phenols in greater amounts, for example, in the neighborhood of 5% or more, is detrimental to the reaction.

In accordance with the present invention it has been found that when a phenolic compound is added in substantially greater than 5% concentrations with respect to the weight of the diolefin starting material, for example, in the range of about 10% to 35%, the catalyst system is modified so as to give a completely new synthesis. In the case of the polymerization of 1,3-butadiene the course of the reaction is altered so as to give, instead of the usual cyclic polymers, the linear dimer 1,3,7-octatriene as the major product along with the linear dimer 1,3,6-octatriene and some cyclic products. The 1,3,7-octatriene can be recovered in commercial quantities having 95% purity from the reaction mixture. The 1,3,6-octatriene can likewise be recovered in 94% purity, but in much smaller quantities.

These linear octatrienes are useful in forming polymers, for example, in synthetic rubber materials, and as a raw material for chemical synthesis.

Without being restricted to a particular theory, it is believed that in the typical Reed reaction of the prior art when zerovalent nickel catalysts are used alone, or with very small quantities of a phenol inhibitor, there is probably a bonding of the butadiene to the nickel by means of pi electrons; these butadienes are then in the proper position for ring closure to cyclooctadiene, cyclododecatriene, vinylcyclohexene, and 1,2-divinylcyclobutane. The only other possible dimer which can be formed by simple pairing of electrons is the 1,3-divinylcyclobutane, which has not been identified. However, if a hydrogen atom with its electron can be transferred, a large number of combinations are possible.

It can be shown that when a phenolic compound is used in larger quantities in the present process, the phenol participates in a hydrogen transfer, since when a deuterated phenol is used, a deuterium atom is found on the linear 1,3,7-octatriene, but not on the cyclic dimers which can be formed by a simple pairing of electrons (compare Example 2). Thus in the present process the phenol is acting not to promote or inhibit an existing reaction, but it acts as a co-catalyst to give a specific new catalyst system for the type of dimerizations which involve hydrogen transfer. In this new catalyst system, the phenol participates in the reaction so as to give entirely new products. The reaction may first require the phenol to be bonded to the nickel. In that case the phenol must compete with the other adducts on the nickel atom, and if the phenol is not as good an electron donor as the ligands already present, it will have to be used in large excess so that some bonding can take place.

It has also been found that certain aliphatic alcohols other than methyl and ethyl alcohol give a similar, though not identical, effect on the dimerization reaction so as to form certain new linear dimers.

It is an object of this invention to prepare linear dimers from open chain conjugated diolefinic compounds.

It is a further object of this invention to provide a catalytic process for the preparation of substantially pure 1,3,6-octatriene and 1,3,7-octatriene from 1,3-butadiene in high purity and commercial yields.

Another object is to provide a process for the separation of 1,3,7-octatriene and 4-vinyl-1-cyclohexene from mixtures containing the two.

The conjugated diolefins especially suitable as starting materials for our invention have from about four to eight carbon atoms per molecule. The preferred diolefin is 1,3-butadiene; other conjugated open chain diolefins, particularly 1,3-diolefins, are useful, including 2-methyl-1,3-butadiene (isoprene); 2,3-dimethyl - 1,3-butadiene; 2-chloro-1, 3-butadiene (chloroprene); 2,3-dichloro-1,3-butadiene; 1,3-pentadiene (piperylene); phenyl diolefins; and 2,4-hexadiene; mixed halogen derivatives may be used, including chloro-fluoro-1,3-butadienes.

The nickel catalysts used as one component of the catalyst system of our invention are the zerovalent nickel catalysts derived from nickel carbonyl. These catalysts include compounds which are known to form cyclic dimers from the above described conjugated open chain diolefins, and have the formula:

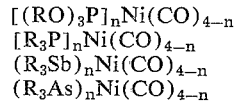

where R is an alkyl, aryl or heterocyclic radical, and $n$ has a value of one or two. The preferred nickel catalysts for the process of our invention have the formula: $X_3P_2Ni(CO)_2$ where X is $C_6H_5$ or $C_6H_5O$, and are known by the names bis(triphenylphosphine) nickel dicarbonyl and bis(triphenylophosphite) nickel dicarbonyl respectively.

The above described phenol effect has also been demonstrated with catalysts having the following formula:

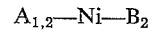

wherein A is triphenyl phosphine or triphenyl phosphite, and B is cinnamonitrile, acrylonitrile, fumaronitrile or acrolein. These catalysts are set forth and claimed in copending application Serial Number 248,257, now abandoned.

Compounds having the above defined general structure where A is zero (the parent compounds) have been reported in the preparation of a group of complexes having the formula Ni(ligand)$_2$ where the ligand is acrylonitrile, acrolein, cinnamonitrile and fumaronitrile. These compounds are prepared, for example, by refluxing nickel carbonyl with the ligand for several hours in an anhydrous solvent, or in a large volume of the participating ligand. Acrolein and acrylonitrile are preferably distilled and stabilized with hydroquinone before use. Care is taken to remove atmospheric oxygen by flushing the reaction vessel with nitrogen before refluxing. The amount of nickel carbonyl used varies from 0.05 to 0.010 mole while that of the ligand varies from 0.06 to 0.20 mole. However, in each case the ratio of nickel carbonyl to ligand is 1:2. During refluxing, carbon monoxide is evolved, which can be measured to determine whether the reaction is quantitative, and the crystalline complexes are formed. The complexes are filtered, washed with a solvent such as methanol and ether, and dried, for example, on a sintered glass funnel under nitrogen. For convenient handling the funnel containing the dry crystals is then stoppered and sealed before being transferred to a "dry bag" where the crystals are placed in a bottle and stored under nitrogen until used.

The adducts are prepared by refluxing the parent compound in a solution of the various ligands under an inert atmosphere until there is a definite color change using reaction times of from 4 to 20 hours. The mono-adduct is obtained when the ratio of parent compound to ligand is 1:1. Generally, the bis-adduct is obtained only when the ligand is present in considerable excess. Exclusion of atmospheric oxygen is necessary. Therefore, all operations such as loading the reaction vessel, filtering, drying and weighing of complexes are performed in an inert atmosphere.

The concentration of catalyst has been conveniently position when activity is decreased. The tertiary butyl group on the phenol enhances the selectivity for 1,5-cyclooctadiene. The most active phenols are phenol, O-cresol, m-cresol, p-cresol, 2,4-xylenol, 3,4-xylenol, 3,5-xylenol and p-methoxyphenol.

The yield of 1,3,7-octatriene varies with the concentration of phenol. The zerovalent nickel catalyst is used in a concentration of from about 0.5% to about 5% by weight of the diolefinic compound, and the phenol in a concentration of from about 10% to about 30%. Although the ratio of phenol and nickel concentration can be varied, the maximum selectivity for 1,3,7-octatriene formation is usually achieved when the weight of the phenol is about 10 to 25 times the weight of the nickel catalyst.

The yield of 1,3,7-octatriene also varies with temperature. The polymerization reaction may be carried out from about 70° C. to about 160° C. Below 100° C. the reaction proceeds at a slow and uneconomical rate; above 160° C. there is no significant increase in reaction rate, or the rate may be reduced. The preferred range is from about 100° to 130° C.

The effect of phenol concentration at several concentrations and temperatures was determined for m-cresol and hydroquinone monomethyl ether, using bis-triphenyl phosphite nickel dicarbonyl catalyst at temperatures within the range of 100° C. and 155° C. for 16 hours. The results are shown in Table I.

TABLE I.—EFFECT OF PHENOL CONCENTRATION AND TEMPERATURE

| Catalyst Concentration, Percent | | Temp., °C. | Product Composition,[3] Percent | | | | Selectivity | |
|---|---|---|---|---|---|---|---|---|
| Phenol[1] | Conc. | Complex[2] | | OT-7 | OT-6 | VCH | COD | COD/VCH | OT-7×10/COD |
| C | 3.5 | 1 | 100 | 13 | 5.8 | 14 | 65 | 4.6 | 2 |
| C | 7 | 1 | 100 | 21 | 5.1 | 12 | 61 | 5.1 | 3.4 |
| C | 18 | 1 | 100 | 31 | 6.8 | 10 | 68 | 6.8 | 4.5 |
| C | 25 | 1 | 100 | 37 | 5.7 | 13 | 35 | 2.3 | 10.6 |
| C | 5 | 3.6 | 100 | 15 | 4.2 | 10 | 55 | 5.5 | 2.7 |
| C | 10 | 3.6 | 100 | 19 | 5.6 | 10 | 49 | 4.9 | 3.9 |
| C | 21 | 3.6 | 100 | 31 | 5.9 | 10 | 35 | 3.5 | 8.8 |
| C | 53 | 3.6 | 100 | 4.5 | 3.8 | 50 | 13 | .3 | 3.5 |
| H | 10 | 1 | 100 | 19 | 0 | 16 | 63 | 4.0 | 3.0 |
| H | 5.3 | 3.6 | 100 | 12 | 2.9 | 11 | 69 | 6.3 | 1.7 |
| H | 21 | 3.6 | 100 | 28 | 5.6 | 11 | 56 | 5.1 | 5.0 |
| C | 0.01 | 1 | 120 | 0 | 0 | 14 | 84 | 6.0 | 0 |
| C | 0.05 | 1 | 120 | 0 | 0 | 17 | 81 | 4.8 | 0 |
| C | 0.11 | 1 | 120 | 0 | 0 | 29 | 69 | 2.4 | 0 |
| C | 1.1 | 1 | 120 | 0.1 | | 28 | 71 | 2.5 | 0.2 |
| C | 2.0 | 1 | 120 | 7.9 | | 29 | 61 | 2.1 | 1.3 |
| C | 10 | 1 | 120 | 34 | | 22 | 32 | 1.5 | 10.6 |
| C | 35 | 1 | 120 | 10 | | 28 | 1.4 | 0.05 | 70 |
| C | 70 | 1 | 120 | 0.7 | | 37 | 1.0 | 0.03 | 7 |
| H | 10 | 1 | 120 | 40 | 0 | 16 | 43 | 2.7 | 9.3 |
| C | 10 | 1 | 155 | 6.4 | 4.4 | 23 | 19 | 0.8 | 3.4 |
| C | 70 | 1 | 155 | 0.7 | | 55 | 5.9 | 0.1 | 1.2 |

[1] C=m-cresol, H=hydroquinone monomethylether.
[2] Bis-triphenylphosphite nickel dicarbonyl.
[3] OT-7=1,3,7-octatriene, OT-6=1,3,6-octatriene, VCH=4-vinyl-1-cyclohexene, COD=1,5-cyclooctadiene.

utilized in the polymerization reaction at about 1% of the amount of the diolefin charged. However, higher or lower catalyst concentrations are practical. As low as 0.5% of catalyst gives excellent results, and about 3% has been used successfully. A range of 0.1 to 10% by weight is practical.

Phenols in high concentrations act as co-catalysts primarily with those nickel catalysts which are effective in the formation of the dimer 1,5-cyclooctadiene. In general, those nickel catalysts which give excellent yields of 1,5-cyclooctadiene will act as co-catalysts with phenols to form the linear dimers with good yields, while those nickel catalysts which are selective for the trimer 1,5,9-cyclododecatriene, in some cases may even be inhibited by phenols.

The phenols which may be used as co-catalysts with the nickel catalyst in this invention encompass mono- or polynuclear mono- or polyphenols. Certain types of phenols are more effective than others. Those phenols which are more basic appear to have a more pronounced effect. Methyl groups have little effect except in the 2,6-

From Table I it is observed that at 120° C., using 1% bis-triphenylphosphite nickel dicarbonyl as the catalyst, the maximum yield of 1,3,7-octatriene (about 35%) was achieved with a m-cresol concentration of 10%; as the m-cresol concentration increased to the 35% concentration level, only 10% of 1,3,7-octatriene was formed, and at 70% concentration of m-cresol, substantially no 1,3,7-octatriene was formed. At 150° C. and a m-cresol concentration of 10%, only 6.4% of 1,3,7-octatriene was formed. Using p-methoxyphenol, the optimum yield (40%) was obtained at a temperature of 120° C. and a 10 to 1 concentration of the phenol relative to the nickel catalyst.

At 100° C. using 10% bis-triphenylphosphite nickel dicarbonyl as the catalyst the best yield (37%) of 1,3,7-octatriene was obtained with a 25% concentration of m-cresol; the yield was decreased to 13% when the m-cresol level was decreased to 3.5%. Using higher concentrations of the nickel catalyst (3.6%), the maximum yield of 1,3,7-octatriene (31%) was obtained at a m-cresol concentration of 21%, only 4.5% of 1,3,7-octatriene being formed at the higher m-cresol concentration of 53%.

The maximum selectivity for 1,3,7-octatriene formation was achieved in the above examples at phenol concentrations of about 10% to 25% relative to the butadiene.

From Table I it is also observed that at a level below about 0.1% by weight of the diolefin starting material, phenol acts as a promoter for the formation of 1,5-cyclooctadiene; above 15% and up to about 35% and possibly higher, phenol functions as a co-catalyst for the production of 1,3,7-octatriene; at a level above about 70%, phenol functions as an inhibitor for dimerization to 1,3,7-octatriene and 1,5-cyclooctadiene.

Widely varying pressures have been successfully used. By way of example, dimerization according to this invention may take place at atmospheric pressure by dissolving the diolefin in a liquid mixture of solvent, catalyst, and activator, by bubbling the olefin, if gaseous, into the mixture. On the other hand, pressures as high as 1790 p.s.i. have been utilized.

Solvents useful in this invention have not been found to be especially critical. Good results are obtained with dicyclopentadiene (dimer of 1,3-cyclopentadiene or 4,7-methylene-2,5-indanediene), alone or mixed with benzene or other solvents such as 1,5-cyclooctadiene. Tetrahydrofuran, toluene, p-cymene, and benzene, alone or in mixture with 1,5-cyclooctadiene, are useful. Others of those suggested herein can be used as the sole solvent. Petroleum ethers, petroleum naphtha, and other hydrocarbon solvents are useful, alone or mixed with other solvents.

If the reagents are not adequately dry, it is beneficial to pretreat with a dehydrating agent, or to incorporate a dehydrating agent in the reaction mixture. Suitable for this is ethylene oxide, calcium carbide, and calcium sulfate.

The addition of water to the reaction mixture in amounts up to 0.05% based on butadiene has no effect on cyclooctadiene formation rate when calcium carbide is present. Above this concentration and up to 1.3% the reaction proceeds at a constant lower rate.

Oxygen must be excluded from the reaction mixture. This is important; even the small traces of oxygen found in ordinary nitrogen are deleterious.

A polymerization inhibitor such as p-tertiarybutyl catechol may also be added. The maximum p-tertiarybutyl catechol concentration tolerable in the reaction mixture is about 0.2% by weight based in the diolefin starting material. The product ratio decreases when higher concentrations are used. A small amount of polymer is formed when less than 0.05% inhibitor is used.

The time is not critical. The reaction is usually substantially complete within 0.5 to 20 hours. The preferred time is from about 2 to about 6 hours.

The products formed from the process of our invention are the linear dimers 1,3,7-octatriene and 1,3,6-octatriene, together with 1,5-cyclooctadiene and 4-vinyl-1-cyclohexene. The 1,3,6-octatriene, as well as the 1,5-cyclooctadiene and unreacted butadiene are readily separated by fractional distillation. However, the pair of compounds 1,3,7-octatriene and 4-vinyl-1-cyclohexene form a close boiling binary system boiling at a temperature of 123° C. which requires a column of very high efficiency to separate; it is not practical to separate them in this way.

We have discovered that a binary mixture of 1,3,7-octatriene and 4-vinyl-1-cyclohexene can be separated readily by the process of liquid thermal diffusion. In this process the linear 1,3,7-octatriene appears at the top of a suitable column and the cyclic 4-vinyl-1-cyclohexene appears at the bottom, both in states of high purity (90% to 95%).

The figure illustrates a method for carrying out the entire procedure for synthesis and separation in a continuous and economical manner. In this description "parts" means weights per unit of time, for example, weights per hour. Although this procedure has been particularly described for 1,3-butadiene, it is likewise applicable to the other open chain conjugated diolefinic compounds named as starting materials for this invention.

Referring to the figure, 950 parts of 1,3-butadiene A are introduced into the top of a tower or pipe reactor B along with 50 parts of recycle 1,3-butadiene from knock-out drum D. Meanwhile about 80 parts of phenol co-catalyst for starting the reaction and about 4 parts of fresh catalyst composed of a suitable zerovalent nickel catalyst in about 46 parts of a solvent, such as 1,5-cyclooctadiene, from container C are line mixed with 387 parts of recycle stream in line G. All the components remain in the reactor B for about 1 hour at a temperature of from 70 to 160° C., and proceed to knock-out drum D for flashing off the unreacted 1,3-butadiene. The bottoms from drum D enter the distillation tower E which is operated at an overhead temperature of 160° C. at atmospheric pressure. The overhead from E, 887 parts, passes to another distillation column, P, operated at 135° C. This separates the product into an overhead stream of 650 parts, and a bottoms stream of 237 parts. The bottom streams goes to another distillation column, V, operated at 145° C. overhead which separates 20 parts of overhead product composed mostly of bicyclo [0,3,3]-octene and a 217 parts of a bottoms product which is 1,5-cyclooctadiene. The overhead from P goes into a thermal diffusion column, Q, from which 500 parts of product are removed continuously from the top and 150 parts from the bottom. The material from the top of Q is fractionated in the still R at a temperature of 125° C. on top to give as overhead product 430 parts of 1,3,7-octatriene and as a bottoms product 70 parts of 1,3,6-octatriene. The bottom effluent from Q is distilled in tower S at a temperature of 122° C. to give as overhead product 50 parts of mixed 1-methylene-2-vinyl-cyclopentane and 1-methyl-2-vinylcyclopentene, and as a bottoms product 100 parts of 4-vinyl-1-cyclohexene. The overhead mixture may be separated into its components by fractionation in the batch still T.

The bottoms from E amounting to 500 parts are split; 300 parts are recycled, while 200 parts are separated by vacuum distillation in tower F. The overhead containing the phenol and trimer is 120 parts, of which 20 parts are combined with the recycle stream and the rest fractionated in H to separate all the phenol overhead, 67 parts, which is recycled. 33 parts of trimer-mixture containing 1,5,9-cyclododecatriene are recovered below at H. The bottoms from tower F are treated for catalyst recovery.

The following examples illustrate methods of carrying out the present invention but it is to be understood that these examples are given for purposes of illustration and not of limitation.

*Example 1.—Testing of phenols*

Into a small stainless steel tube equipped with a valve at one end is charged a reaction mixture comprising:

| | Percent by weight |
|---|---|
| Bis(triphenylphosphite)nickel dicarbonyl catalyst | 1 |
| Phenol to be tested | 10 |
| Freshly ground calcium carbide | 1–10 |
| p-Xylene | 10 |
| Freshly distilled liquid 1,3-butadiene, remainder. | |

Oxygen is carefully excluded and anhydrous conditions are used. The reaction mixture is heated at 120° C. for 16 hours by placing the tube in an oil bath equipped with thermostat controls. The products were examined by vapor phase chromatography.

The bis(triphenylphosphite)nickel dicarbonyl used as catalyst is freshly prepared by mixing at room temperature solutions of nickel carbonyl with solutions of triphenylphosphite in the ratio of 1:2 in order to obtain displacement of the two carbonyl groups. Completion of the reaction is denoted by the absence of carbon monoxide evolution, after the reaction mixture has been allowed to stand overnight attached to a gas bubbler.

Table II shows the yields of 1,3,7-octatriene which were obtained using a 10% by weight concentration of the phenol indicated.

TABLE II

Phenol: Yield percent 1,3,7-octatriene
- Phenol _____ 25
- o-Cresol _____ 25
- n-Cresol _____ 34
- p-Cresol _____ 43
- o-Tert.butylphenol _____ 5.5
- p-Tert.butylphenol _____ 15
- o-α-Phenethylphenol _____ 12
- 2,4,-xylenol _____ 25
- 2,6-xylenol _____ 10
- 3,4-xylenol _____ 29
- 3,5-xylenol _____ 30
- 2-methyl-5-isopropyl-1-phenol (Carvacrol) ___ 21
- 5-methyl-2-isopropyl-1-phenol (Thymol) _____ 12
- 2-methyl-4-tert.butyl-1-phenol _____ 19
- p-Chlorphenol _____ 13
- 3,5-dinitrophenol _____ 14
- 3,5-dinitro-o-cresol _____ 6
- m-Ethoxyphenol _____ 10
- p-Methoxyphenol _____ 43
- Resorcinol _____ 4.2
- Phloroglucinol _____ 1.2
- p-Aminophenol _____ 3

Table III below shows the yields of 1,3,7-octatriene which were obtained using 10% by weight of m-cresol and 1% by weight of the catalyst indicated.

TABLE III

| Catalyst | Conc., percent | Cresol Conc., percent | Temp., °C. | Product Composition, Percent | | |
|---|---|---|---|---|---|---|
| | | | | OT | VCH | COD |
| Triphenylphosphite nickel diacrylonitrile. | 4.7 | 0 | 120 | 0 | 14 | 76 |
| | 2.3 | 21 | 100 | 34 | 10 | 42 |
| Bis(triphenylphosphite) nickel diacrylonitrile. | 4.7 | 0 | 120 | .3 | 14 | 74 |
| | 2.0 | 21 | 100 | 30 | 11 | 43 |

OT=1,3,7-octatriene, COD=1,5-cyclooctadiene, VCH=4-vinyl-1-cyclohexene.

Triphenylphosphite nickel diacrylonitrile was prepared by refluxing 0.72 g. of solid nickel diacrylonitrile in a solution of 2.4 g. of triphenylphosphite in 50 cc. of ether for 8–9 hours. The red color of nickel diacrylonitrile changed to a pale orange. The pale orange flakes were filtered and washed with ether.

Bis(triphenylphosphite)nickel diacrylonitrile was prepared by adding 2.0 g. of solid nickel diacrylonitrile to a solution of 23.7 g. of triphenylphosphite in 50 cc. of ether and refluxing for 3–8 hours. The red solid changed slowly to straw yellow and finally to a white solid. This was filtered and reprecipitated by the addition of hexane to an ether solution in which it was slightly soluble. The product decomposed at 100° C.

The nickel diacrylonitrile was prepared in a known manner by refluxing nickel carbonyl with acrylonitrile for several hours in an anhydrous solvent, or in a large volume of the acrylonitrile.

*Example 2.—Mechanism of hydrogen transfer*

Participation of the phenol in the reaction was demonstrated by using deuterated cresol, which was prepared by equilibrating p-cresol with an equal volume of deuterium oxide in a stoppered flask at room temperature with occasional agitation for several days. The phenol was separated and distilled at 117–118°/30 mm. Hg to give a heart cut of p-cresol. By infrared spectroscopy the cresol was shown to be about 75% monodeuterated on the hydroxyl hydrogen. On standing in air the deuterium level decreased to zero. A portion of the deuterated p-cresol (0.4 ml.) was added to a standard micro-reactor containing bis(triphenylphosphite) nickel dicarbonyl and calcium carbide in concentration of about 1%. Then 6 ml. of 1,3-butadiene were added, and the reaction mixture heated at 120° C. for 17 hours. The product had the following composition:

Percent
- 1,3,7-octatriene _____ 34
- 1,3,6-octatriene _____ 6
- Vinylcyclohexene _____ 13
- Cyclooctadiene _____ 46

The product was separated on a preparative vapor phase chromatography column into a fraction containing the first three components and one containing only the 1,5-cyclooctadiene. The preparative column was made up of four 10 foot sections of ½″ copper tubing containing polyester on firebrick. Two fractions were collected using successive 1 ml. charges of sample to the column. The latter fraction was refractionated on 33 ft. of a silicone rubber on firebrick column (½″ in diameter). The first fraction by mass spectroscope showed that 13% of the 1,3,7-octatriene present was mono-deuterated and the rest was the normal product. The second fraction was the normal cyclic dimer with less than 1% (no detectable quantity) of deuterated compound.

*Example 3.—Synthesis of 1,3,7-octatriene*

A one-liter autoclave was charged with 5–10 gms. of freshly ground calcium carbide, 72 g. of m-cresol, 15 g. of p-xylene and 7 gms. of bis(triphenylphosphite)nickel dicarbonyl. It was then closed, purged with oxygen-free nitrogen and cooled by packing in solid carbon dioxide. Pure 1,3-butadiene freshly distilled from a cylinder was added as 419 gms. of chilled liquid from a serum capped bottle having a hypodermic needle attached by a rubber hose to a valve inlet on the autoclave. The chilled autoclave was purged six times with oxygen-free nitrogen, the valve was closed and the autoclave was heated in flowing steam (no shaking) for 20 hours. At the end of this period of time the autoclave was cooled to room temperature, vented to the air and the contents distilled through a Widmer column at atmospheric pressure to an overhead temperature of 175° C. The distillate weighed 324 gms. while the residue weighed 177 gms. The composition of the distillate as determined by vapor phase chromatography is given in Table IV.

TABLE IV.—COMPOSITION OF DIMER DISTILLATE

| Component | Yield, percent of— | |
|---|---|---|
| | Distillate | Butadiene |
| Divinylcyclobutane | 0.6 | 0.2 |
| 1-methyl-2-vinylcyclopentene | 1.2 | 0.5 |
| 1-methylene-2-vinylcyclopentane | 3.5 | 2.6 |
| 1,3,7-octatriene | 34.0 | 27.0 |
| 4-vinyl-1-cyclohexene | 9.2 | 7.2 |
| 1,3,6-octatriene | 11.0 | 7.6 |
| Bicyclo[0,3,3]-octene | 1.5 | 1.2 |
| p-Xylene | 4.8 | |
| 1,5-cyclooctadiene | 34.0 | 27.0 |

The distillate was then fractionated in a 3 foot long, 1 inch diameter distillation column filled with Helipack.

Each of these distillate fractions was analyzed with the results shown in Table V. The data indicate that by distillation alone, the 1,3,6-octatriene and 1,3,7-octatriene can be separated from each other, but not from 4-vinyl-1-cyclohexene, and that 1,5-cyclooctadiene can be separated from the others. In the usual production operations no xylene will be present.

In a continuous process, the feed was introduced through the center port of the diffusion column. The 1,3,7-octatriene was removed as a concentrate from the top of the column, while 4-vinyl-1-cyclohexene, p-xylene and 1,5-cyclooctadiene were removed continuously from the bottom. Details of the experimental arrangement are as follows: To minimize liquid holdup, all lines (ex-

TABLE V.—COMPOSITION OF DISTILLATE FRACTION

| Fraction No | 1 | 2 | 3 | 4 | 5 | 6 | 7 | 8 | 9 | Residue |
|---|---|---|---|---|---|---|---|---|---|---|
| Initial Boil. Pt., ° C | 108 | 115 | 120 | 122 | 125 | 130 | 136 | 144 | 148 | |
| Percent of Total Charge | .6 | 2.1 | 3.4 | 18 | 25.8 | 7.9 | 2.6 | 4.5 | 3 | 33 |

COMPOSITION PERCENT OF FRACTION

| | | | | | | | | | | |
|---|---|---|---|---|---|---|---|---|---|---|
| Divinylcyclobutane | 30 | 9 | 2 | 0.1 | 0 | 0 | 0 | 0 | 0 | 0 |
| Methylvinylcyclopentene | 18 | 13 | 4 | 0.5 | 0 | 0 | 0 | 0 | 0 | 0 |
| Methylenevinylcyclopentane | 35 | 44 | 31 | 5 | .8 | 0 | 0 | 0 | 0 | 0 |
| 1,3,7-octatriene | 9 | 27 | 53 | 78 | 54 | 3.5 | .5 | 0 | 0 | 0 |
| 4-vinyl-1-cyclohexene | 3 | 7 | 9 | 17 | 26 | 13 | .5 | .5 | .3 | 0 |
| 1,3,6-octatriene | 0 | 0 | 0 | 0 | 18 | 37 | 4 | 1 | 0 | 0 |
| p-Xylene | 0 | 0 | 0 | 0 | 1.5 | 46 | 83 | 55 | 10 | 1 |
| Bicyclo[0,3,3]-octene | 0 | 0 | 0 | 0 | 0 | 2 | 8 | 9 | 3 | 0 |
| 1,5-cyclooctadiene | 0 | 0 | 0 | 0 | 0 | 0 | 3 | 33 | 86 | 99 |

*Example 4.—Separation of linear trimers*

The linear trimers were separated from 4-vinyl-1-cyclohexene by the process of liquid thermal diffusion in an apparatus consisting of two vertically mounted 6 ft. long concentric stainless steel tubes sealed to each other at top and bottom to give a chamber having an annular space of 1 mm. and a volume of 50 ml. The outer tube, approximately 1 inch in diameter, was electrically heated and was insulated. The inner tube carried a flow of cold water from bottom to top, creating a thermal gradient horizontally across the chamber. There are eleven equally spaced ports. The one at the top (No. 1) and the one at the bottom (No. 11) lead to the column, the center port (No. 6) being the feed port.

In a batch process the thermal diffusion column was filled by means of attaching a leveling bulb to a piece of plastic tubing which is attached to the middle port of the vertically mounted diffusion column. The leveling bulb was placed in a position slightly higher than the uppermost port of the column. With all the ports closed, the feed material is introduced into the leveling bulb until it flowed out of the uppermost port (No. 1) which was then sealed. Heat was applied to the outer wall by application of an electric current to resistance winding about the wall while cold water passed in at a rate of about 2 liters per minute from the bottom to the top. In this way an outer wall temperature of from 52° to 44° C. from top to bottom is obtained while the inner wall temperature was 24° to 17° C. The column is operated for 24 hours and then sampled at each port. Samples were analyzed by vapor phase chromatography with the results given in Table VI.

TABLE VI.—SEPARATION OF OCTATRIENES BY THERMAL DIFFUSION

| Sample | Composition, percent by weight | | | |
|---|---|---|---|---|
| | MVC [1] | VHC [2] | OT-7 [3] | OT-6 [4] |
| Feed | 0.2 | 41 | 59 | 4 |
| Product from Port— | | | | |
| 3 | 0 | 4 | 92 | 5 |
| 4 | 0 | 8 | 86 | 5 |
| 5 | 0.2 | 16 | 78 | 0 |
| 7 | 0.4 | 36 | 63 | 0 |
| 8 | 0.6 | 45 | 55 | 0 |
| 9 | 0.8 | 62 | 37 | 0 |
| 10 | 0.9 | 83 | 16 | 0 |
| 11 | 0.7 | 90 | 9 | 0 |

[1] MVC = Methylvinylcyclopentene.
[2] VCH = 4-vinyl-1-cyclohexene.
[3] OT-7 = 1,3,7-octatriene.
[4] OT-6 = 1,3,6-octatriene.

cept were specified) were of ⅛″ copper or Tygon tubing, and all valves were ⅛″ brass needle valves. Flow rates were controlled by valves attached to the exit lines. At the center or feed port, a ¼″ stainless steel nipple was attached to a valve by means of a brass Swagelok fitting and reducer. (The valve was kept open during the run.) The feed reservoir, a 500 ml. leveling bulb positioned about 2 feet above the column, was connected to this valve through a short length of Tygon tubing followed by copper tubing. The top opening of the reservoir was capped with a rubber serum bottle stopper. About 5 p.s.i. of nitrogen was applied to the reservoir through a hypodermic needle which punctured the stopper. The top port (equipped to take ⅛″ tubing) was fitted with a rising vertical 6″ length of ¼″ copper tubing connecting to a ¼″ T. The top of this T was vented to the reservoir to permit any gas which might be formed in the column during the run to escape from the exit line, and thus avoid a vapor lock. The effluent from the top of the colum over-flowed through the horizontal arm of the T and was carried down to a receiver through copper tubing bearing a valve. The bottom port was also fitted with a valve and tubing. Evaporation of effluent (from each port) was minimized by passing the terminal part of the copper tubing exit line down through a 2 foot length of 4 mm. inside diameter glass tubing, the bottom of which was sealed to a male 24/40 taper joint. Effluent was collected in flasks having female 24/40 taper joints.

Flow rates were about 2 to 3 ml. per hour. A steady state was achieved in less than 16 hours. Concentrates containing up to 95% of 1,3,7-octatriene were obtained. 1,3,6-octatriene also migrated to the top of the column. The column was operated with an outer wall temperature in the range 45–50° C. and an inner wall temperature in the range of 9–15° C.

The structure of 1,3,7-octatriene was proved by hydrogenation to n-octane which was identified as such by infrared absorption, refractive index and vapor phase chromatography. Furthermore, infrared absorption spectrum showed two vinyl groups and a trans-unsaturation conjugated with a vinyl group. Ozonolysis gave the expected succinic acid. Nuclear magnetic resonance spectroscopy confirmed the assigned structure. Other properties are: B.P.=123° C., $D_4^{25}$=0.7640, $n_D^{24.8}$=1.46446. The reported properties for a known 1,3,7-octatriene are: B.P.=119–121° C., $D_4^{15}$=0.763, $n_D^{18}$=1.4636. The mass spectrum showed the molecular weight to be 108 ($C_8H_{12}$ is 108).

The structure of 1,3,6-octatriene was proved by examining a sample prepared in 94% purity by preparative vapor phase chromatography. (1,3,6-octatriene was the major impurity.) Mass spectroscopy gave a molecular weight of 108 and hydrogenation yielded n-octane. Infrared absorption showed the presence of trans-unsaturation conjugated with a vinyl group, and only a single vinyl group.

The other dimers present in minor amount were identified by spectroscopy and hydrogenation as 1-methyl-2-vinylcyclopentene, 1-methylene-2-vinylcyclopentane, bicyclo-(0,3,3)-octene, divinylcyclobutane, and 3-methylheptatriene.

While particular embodiments of this invention are shown above, it will be understood that the invention is obviously subject to variations and modifications without departing from its broader aspects.

What is claimed is:

1. A process for the production of linear dimers of aliphatic conjugated diolefinic compounds which comprises polymerizing an aliphatic conjugated diolefinic compound having from about four to eight carbon atoms per molecule at a temperature within the range of 70° C. to 160° C. in the presence of a zerovalent nickel catalyst derived from nickel carbonyl and selected from compounds having the formula:

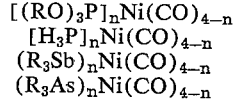

wherein R is an alkyl, aryl or heterocyclic radical, and $n$ has a value of one or two and compounds having the formula:

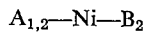

wherein A is triphenyl phosphine or triphenyl phosphite, and B is cinnamonitrile, acrylonitrile, fumaronitrile, or acrolein, and a phenolic compound as co-catalyst, said nickel catalyst being present in an amount equal to 0.5% to 5% by weight of said diolefinic compounds, and said phenolic co-catalyst being present in an amount equal to about 10% to 30% by weight of said conjugated diolefinic compound.

2. The process of claim 1 wherein said diolefinic compound is 1,3-butadiene and said linear dimers are 1,3,7-octatriene and 1,3,6-octatriene.

3. The process of claim 1 wherein said nickel catalyst has the formula $[(RO)_3P]_nNi(CO)_{4-n}$, wherein R is an organic radical selected from the group consisting of alkyl, aryl and heterocyclic, and $n$ has a value of from 1 to 2.

4. The process of claim 3 wherein said nickel catalyst is bis(triphenylphosphine)nickel dicarbonyl.

5. The process of claim 3 wherein said nickel catalyst is bis(triphenylphosphite)nickel dicarbonyl.

6. The process of claim 1 wherein said nickel catalyst is characterized by the formula: $A_{1,2}$—Ni—$B_2$ wherein A is selected from the group consisting of triphenyl phosphine and triphenyl phosphite, and B is selected from the group consisting of cinnamonitrile, acrylonitrile, fumaronitrile and acrolein.

7. The process of claim 6 wherein said nickel catalyst is triphenylphosphite nickel diacrylonitrile.

8. The process of claim 6 wherein said nickel catalyst is bis(triphenylphosphite)nickel diacrylonitrile.

9. The process of claim 1 wherein said phenolic compound is phenol.

10. The process of claim 1 wherein said phenolic compound is cresol.

11. The process of claim 1 wherein said phenolic compound is 2,4-xylenol.

12. The process of claim 1 wherein said phenolic compound is 3,4-xylenol.

13. The process of claim 1 wherein said phenolic compound is 3,5-xylenol.

14. The process of claim 1 wherein said phenolic compound is p-methoxyphenol.

15. A process for the preparation of 1,3,7-octatriene which comprises polymerizing 1,3-butadiene in the presence of from 0.5% to about 5% of bis(triphenylphosphite)nickel dicarbonyl catalyst and from about 10% to about 30% by weight of m-cresol co-catalyst at a temperature within the range of 70° to 160° C., separating the components of the product by fractional distillation, and then separating the 1,3,7-octatriene from the resulting binary system of 1,3,7-octatriene and 4-vinyl-1-cyclohexene by thermal diffusion.

16. A process for the preparation of 1,3,6-octatriene which comprises polymerizing 1,3-butadiene in the presence of from 0.5% to about 5% of bis(triphenylphosphite)nickel dicarbonyl catalyst and from about 10% to about 30% by weight of m-cresol co-catalyst at a temperature within the range of 70° to 160° C. and then separating the 1,3,6-octatriene from the resulting product mixture by fractional distillation.

17. A continuous process for the production of 1,3,6-octatriene and 1,3,7-octatriene which comprises the steps of:

(a) introducing into a reactor 1,3-butadiene, a zerovalent nickel catalyst derived from nickel carbonyl and selected from compounds having the formula:

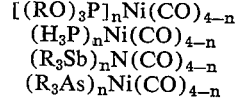

wherein R is an alkyl, aryl, or heterocyclic radical, and $n$ has a value of one or two and compounds having the formula:

wherein A is triphenyl phosphine or triphenyl phosphite, and B is cinnamonitrile, acrylonitrile, fumaronitrile, or acrolein, and a phenolic compound, said nickel catalyst being present in an amount equal to 0.5 to 5% by weight of said diolefinic compound, and said phenolic compound being present in an amount equal to about 10 to 30% by weight of said diolefinic compound;

(b) maintaining the temperature of the reactants in said reactor within the range of 70 to 160° C. for about one hour;

(c) stripping off the unreacted 1,3-butadiene from the product and recycling to said reactor;

(d) separating the liquid components of the product by fractional distillation;

(e) separating by liquid diffusion 4-vinyl-1-cyclohexene from the distillation fraction of step (d) which contains an admixture of said 4-cyclohexene-1 with 1,3,6-octatriene-1,3,7-octatriene; and (f) separating 1,3,6-octatriene from 1,3,7-octatriene from mixtures thereof obtained in step (e) by fractional distillation.

18. 1,3,6-octatriene.

References Cited by the Examiner

UNITED STATES PATENTS

| | | | |
|---|---|---|---|
| 2,504,016 | 4/1950 | Foster | 260—666 |
| 2,686,208 | 8/1954 | Reed | 260—666 |
| 2,991,317 | 7/1961 | Sellers et al. | 260—666 |

OTHER REFERENCES

Egloff: "Physical Constants of Hydrocarbons," volume 5, 1963, Reinhold Pub. Co., page 459.

ALPHONSO D. SULLIVAN, *Primary Examiner.*

D. S. ABRAMS, *Assistant Examiner.*

UNITED STATES PATENT OFFICE
CERTIFICATE OF CORRECTION

Patent No. 3,284,529            Dated November 8, 1966

Inventor(s) Julian Feldman, Bernard A. Saffer, and Orville D. Frampton

It is certified that error appears in the above-identified patent and that said Letters Patent are hereby corrected as shown below:

Claim 1, line 10: should read

-- $(R_3P)_n Ni(CO)_{4-n}$ --

Claim 4, line 1: should read

-- The process of claim 1 . . . --

Claim 17, line 8: should read

-- $(R_3P)_n Ni(CO)_{4-n}$ --

Signed and sealed this 3rd day of August 1971.

(SEAL)
Attest:

EDWARD M. FLETCHER, JR.
Attesting Officer

WILLIAM E. SCHUYLER, JR.
Commissioner of Patents